United States Patent
Wakuda et al.

(10) Patent No.: US 10,481,697 B2
(45) Date of Patent: Nov. 19, 2019

(54) SYSTEM AND INPUT METHOD FOR RECEIVING INPUT IN RESPONSE TO MOTION OF USER

(71) Applicant: Panasonic Intellectual Property Management Co. Ltd., Osaka (JP)

(72) Inventors: Daisuke Wakuda, Kyoto (JP); Kenichi Ezaki, Osaka (JP); Takashi Matsumoto, Osaka (JP)

(73) Assignee: PANASONIC INTELLECUTAL PROPERTY MANAGEMENT CO., LTD., Osaka (JP)

( * ) Notice: Subject to any disclaimer, the term of this patent is extended or adjusted under 35 U.S.C. 154(b) by 2 days.

(21) Appl. No.: 15/416,022

(22) Filed: Jan. 26, 2017

(65) Prior Publication Data
US 2017/0262062 A1    Sep. 14, 2017

(30) Foreign Application Priority Data
Mar. 11, 2016   (JP) .................. 2016-048346

(51) Int. Cl.
*G06F 3/01* (2006.01)
(52) U.S. Cl.
CPC ............. *G06F 3/017* (2013.01); *G06F 3/016* (2013.01)
(58) Field of Classification Search
None
See application file for complete search history.

(56) References Cited

U.S. PATENT DOCUMENTS

| | | |
|---|---|---|
| 2008/0211832 A1 | 9/2008 | Kumon |
| 2014/0062866 A1 | 3/2014 | Yamashita |
| 2015/0193197 A1 | 7/2015 | Nahman et al. |
| 2017/0192629 A1* | 7/2017 | Takada ............... G06F 3/0482 |

FOREIGN PATENT DOCUMENTS

| | | |
|---|---|---|
| DE | 10 2014 204 289 | 9/2015 |
| JP | 2000-006687 | 1/2000 |
| JP | 2005-063092 | 3/2005 |
| JP | 2005-254851 | 9/2005 |
| JP | 2007-069676 | 3/2007 |
| JP | 2014-048938 | 3/2014 |
| JP | 2015-143987 | 8/2015 |
| JP | 2016-018223 | 2/2016 |

OTHER PUBLICATIONS

Extended European Search Report dated May 19, 2017 in the related European Patent Application No. 17154535.3.
Rajinder Sodhi et al., "AIREAL: Interactive Tactile Experiences in Free Air", ACM Transactions on Graphics (TOG), vol. 32, No. 4, Article 134, pp. 1-10, Jul. 21, 2013, XP055367928.

* cited by examiner

*Primary Examiner* — Brian M Butcher
(74) *Attorney, Agent, or Firm* — Wenderoth, Lind & Ponack, L.L.P.

(57) ABSTRACT

A system includes: a sensor that detects motions of a first portion and a second portion of a body of a user; a controller that sets a base point of the second portion in response to the motion of the first portion and receives a prescribed input in response to the motion of the second portion with respect to the base point; and a notification device that contactlessly notifies a third portion of the body that the base point is set.

16 Claims, 7 Drawing Sheets

SYSTEM AND INPUT METHOD FOR RECEIVING INPUT IN RESPONSE TO MOTION OF USER

BACKGROUND

1. Technical Field

The present disclosure relates to a system and a method for receiving an input in response to a motion of a user.

2. Description of the Related Art

Japanese Unexamined Patent Application Publication No. 2000-6687 and Japanese Unexamined Patent Application Publication No. 2007-69676 disclose systems in related art that receive an input from a user. Those systems include an input unit that includes plural switches provided around hands of a driver, an image-capturing unit that captures an image of the input unit, and a display unit that is provided in a forward direction of a line of sight of the driver. The display unit displays an image of the plural switches of the input unit and an image of the hand of the driver in a superimposed manner. Those systems enable the user to perform a correct input by looking at the display unit in the forward direction of the line of sight but without looking at the input unit around the hands.

SUMMARY

In one general aspect, the techniques disclosed here feature a system including: a sensor that detects motions of a first portion and a second portion of a body of a user; a controller that sets a base point of the second portion in response to the motion of the first portion and receives a prescribed input in response to the motion of the second portion with respect to the base point; and a notification device that contactlessly notifies a third portion of the body that the base point is set.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
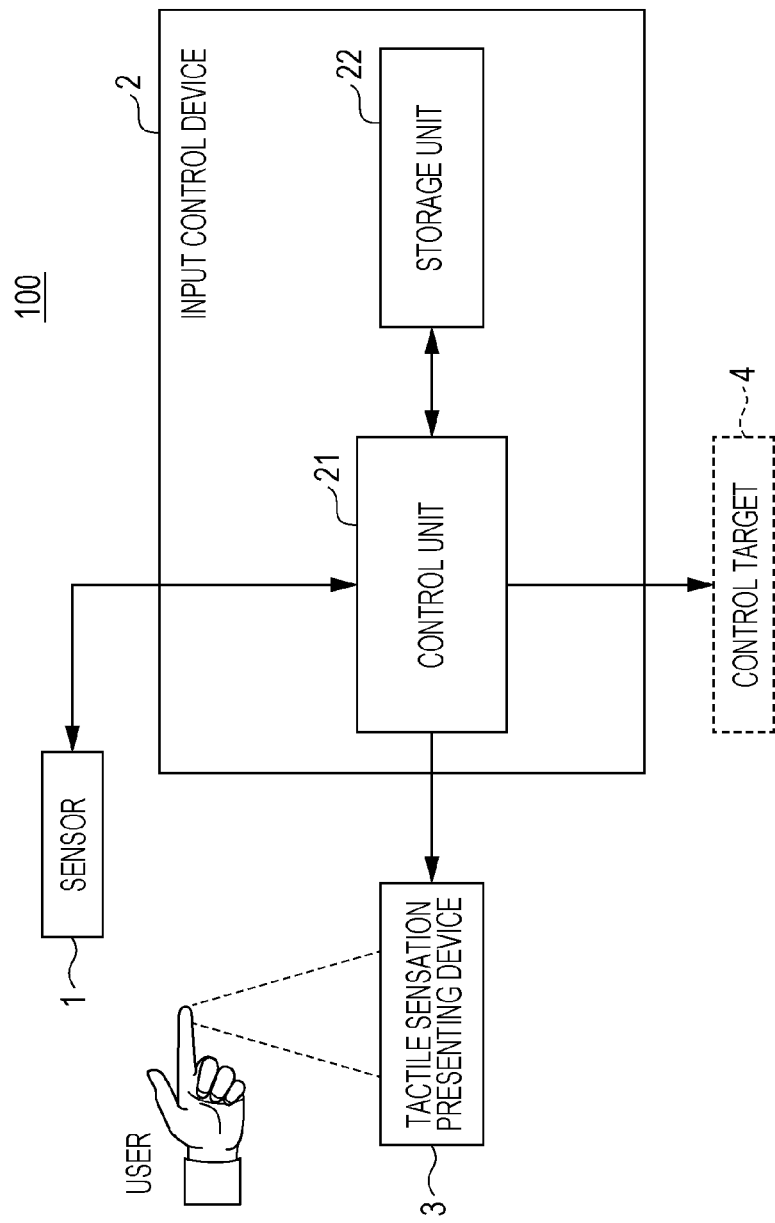
FIG. 1 is a block diagram that illustrates a configuration of a gesture input system according to a first embodiment.

A gesture input system according to an aspect of the present disclosure includes a sensor that detects motions of a first portion and a second portion of a body of a user, a controller that sets a base point of the second portion in response to the motion of the first portion and receives a prescribed input in response to the motion of the second portion with respect to the base point, and a notification device that notifies a third portion of the body that the base point is set in a contactless manner.

The "second portion" is a portion of the body that is detected to read a prescribed gesture which is associated with an operation for performing a prescribed input. The "first portion" is a portion of the body that is detected to read a prescribed gesture which is associated with an operation for setting the base point of the second portion. The "third portion" is a portion of the body to which a fact that the base point is set is notified.

"Detecting a motion" means detection of at least one selected from a group consisting of a movement amount, a movement velocity, a movement direction, and a stationary time of a detection target, for example. "Detecting a motion" includes not only the detection of moving of the detection target but also the detection of not moving of the detection target.

"Reference section", "traced section", and "notified section (or tactile sensation presenting section)" that will be described in the following various embodiments are respective examples of the "first portion", the "second portion", and the "third portion".

A "home position" that will be described in the following various embodiments is one example of the "base point".

An "input control device" that will be described in the following various embodiments is one example of the "controller". The controller may be a semiconductor device, a semiconductor integrated circuit (IC), or large scale integration (LSI), for example, or an electronic circuit as a combination thereof. The LSI or IC may be integrated into one chip or may be formed by combining plural chips. For example, each function block that will be described in the embodiments may be integrated into one chip. Here, the LSI or IC may be referred to as system LSI, very large scale integration (VLSI), or ultra large scale integration (ULSI), for example, in accordance with the degree of integration. The controller includes a memory in which a program for executing a prescribed algorithm is recorded. This algorithm includes a step of setting the base point of the second portion of the body in response to the motion of the first portion of the body of the user, a step of notifying the third portion of the body that the base point is set in a contactless manner, and a step of receiving a prescribed input in response to the motion of the second portion with respect to the base point, for example.

In the gesture input system according to an aspect, for example, the notification device may stimulate cutaneous sensation of the third portion to provide a notification that the base point is set.

The "cutaneous sensation" is the sensation that a human body may recognize through the skin. Examples of the cutaneous sensation may include the sense of touch, the sense of vibration, the sense of pressure, the sense of heat, the sense of cold, and the sense of pain. "Stimulating the cutaneous sensation" may be providing a stimulus by a vibration and/or a pressure or may be providing heat sensation and/or cold sensation, for example. For example, the notification device may provide a vibration and/or an acoustic radiation pressure to the user by a vibrator (an ultrasonic vibrator, for example), may generate plasma in the air by laser and thereby provide an impact on the skin that contacts with the plasma, or may provide an air pressure wave to the user by an air cannon. Alternatively, the notification device may provide the heat sensation to the user by an infrared source or may provide the cold sensation to the user by a Peltier element. In other words, the notification device may include at least one selected from a group consisting of the vibrator, the laser, the air cannon, the Peltier element, and the infrared source. Note that in the following embodiments, the stimulus for the cutaneous sensation may be referred to as "tactile sensation" for convenience of description. However, the "cutaneous sensation" in the present disclosure is not limited to the sense of touch.

In the gesture input system according to an aspect, for example, the controller may acquire coordinates in the real space as respective pieces of positional information of the first portion, the second portion, and the third portion.

Note that in the present disclosure, coordinates that are mapped in the real space may be referred to as "real coordinates", and coordinates that are mapped in the virtual space corresponding to the real space may be referred to as "virtual coordinates".

All the various embodiments that will be described in the following merely illustrate specific examples. Values, shapes, elements, arrangement or connection of elements, steps, orders of steps, and so forth that are described in the following embodiments are mere examples and do not limit the present disclosure. The elements that are not described in the independent claims among the elements that will be described in the following are optional elements. Further, the configurations to which the same reference characters are given in the drawings may not be described.

Underlying Knowledge Forming Basis of the Present Disclosure

In systems in related art that are disclosed in Japanese Unexamined Patent Application Publication No. 2000-6687 and Japanese Unexamined Patent Application Publication No. 2007-69676, because the location to which an input is possible is limited to the position of an input unit, the user has to move a hand to the position of the input unit in order to perform an input. In addition, in the systems in related art, the user has to direct eyes in the direction to a display unit and to confirm an image by the sense of sight in order to correctly perform an intended input. As described above, the systems in related art are inconvenient for the user.

The gesture input system and a gesture input method according to various embodiments that will be described in the following enable the user to perform a correct input without moving the hand to the position of the input unit or directing the eyes in the direction to the display unit. The gesture input system that will be described in the following employs a gesture input and a contactless notification. Accordingly, the user may perform an input accurately and quickly without moving the hand to the position of the input unit. For example, in a case where the user drives an automobile, the user may perform an input operation without lowering the concentration on driving.

The "gesture input" is an input method in which the user informs an electronic apparatus or the like of an intention of an operation of the user by using a motion of a portion of the body. In general, in an electronic apparatus, the motion of the body in the gesture input, the intention of the user about the operation of the electronic apparatus, and a command in the electronic apparatus are related with each other. The electronic apparatus analyzes the motion of the body that is detected by a sensor, makes a determination about an expression of the intention of the user about the operation, and executes a command that is related with a determination result.

The gesture input is performed by using a portion of the body (a fingertip, for example). Thus, the sensor traces the motion of the portion of the body. In the following description, the portion of the body that is traced for the gesture input may be referred to as "traced section". In the gesture input, the motion of the body is read as a state change of the traced section from a certain time as a starting point, for example. The state change of the traced section is established with a combination of the movement amount, the movement velocity, the movement direction, the stationary time, and so forth of the traced section.

In the following description, the base point (start point) of the gesture input in the space may be referred to as "home position". The home position in the real space is the real coordinates where the traced section is positioned at the time as the starting point of the gesture input, for example.

In other words, the motion of the body in the gesture input is established with the relative relationship between the traced section and the home position. For example, the motion of the body in the gesture input is established with a combination of the movement amount, the movement velocity, the movement direction, the stationary time, and so forth of the traced section from the home position.

In a case where the body of the user is ceaselessly moving, it is difficult to distinguish whether or not the motion of the body of the user is an action of an intention of the gesture input. Thus, in order to make the distinction certain, the user has to be caused to recognize a time as a starting point of the gesture input and the position of the home position.

Accordingly, in the gesture input system and the gesture input method according to various embodiments that will be described in the following, first, the home position is set before the gesture input, and the position of the home position is notified to the user. This notification is performed by presenting the tactile sensation to the user in a contactless manner. For example, the position of the fingertip of the user at a certain time is set as the home position, and the tactile sensation is provided to the fingertip. Accordingly, the user may recognize that the home position is set and may thereafter perform an intended gesture input. Thus, the gesture input that is intended by the user may accurately be distinguished with respect to the home position as the base point.

First Embodiment

A first embodiment will hereinafter be described with reference to drawings. Note that in the description made hereinafter, terms will be defined as follows.

Reference section: the portion of the body which is referred to in a case where the expression of the intention of the user that the user requests setting of the home position is read.

Traced section: the portion of the body that is traced for the gesture input.

Tactile sensation presenting section: the portion of the body to which the tactile sensation is presented in a contactless manner.

[1. Configuration of Gesture Input System]

FIG. 1 illustrates a configuration example of a gesture input system according to this embodiment. A gesture input system 100 includes a sensor 1 that detects the motion of the body of the user, an input control device 2 that receives the gesture input of the user based on an output of the sensor 1, and a tactile sensation presenting device 3 that presents the tactile sensation to the user in accordance with the control by the input control device 2.

The sensor 1 is a sensor that is capable of detecting the motion of a human body. The sensor 1 includes a visual sensor such as a camera. For example, the sensor 1 is a distance image sensor or a laser sensor that is capable of three-dimensionally detecting the motion of the human body in a contactless manner. The sensor 1 may be a sensor that is capable of detecting the motion of the human body and may be an ultrasonic sensor, an infrared sensor, or a visible light sensor, for example.

In this embodiment, the sensor 1 detects a motion of the reference section that is a portion of the body of the user, a motion of the traced section that is a portion of the body of the user, and a motion of the tactile sensation presenting section (or the notified section) that is a portion of the body of the user. For example, the sensor 1 acquires three-dimensional coordinates of the reference section, the traced section, and the tactile sensation presenting section as information about the motions of the reference section, the traced section, and the tactile sensation presenting section. The reference section, the traced section, and the tactile sensation presenting section may arbitrarily be decided by the input control device 2. For example, the reference section, the traced section, and the tactile sensation presenting section are the upper half of the body, face, hand, finger, or fingertip. The reference section, the traced section, and the tactile sensation presenting section may be the same location or may be different locations. The sensor 1 outputs the information about the detected motions of the reference section, the traced section, and the tactile sensation presenting section.

The input control device 2 includes a control unit 21 that sets the home position and receives the gesture input based on the information detected by the sensor 1 and a storage unit 22 that stores the set home position. The control unit 21 may be realized by a semiconductor element or the like, for example, a microcomputer. The control unit 21 may be configured only with hardware or may be realized by combining hardware and software. The storage unit 22 may be realized by a DRAM, a flash memory, a ferroelectric memory, or the like, for example. The control unit 21 controls a control target 4 in accordance with the received gesture input. The control target 4 is an arbitrary device, for example, a navigation device, an air conditioning device, or an audio device.

The tactile sensation presenting device 3 is a notification device that is capable of presenting a tactile sensation via the air. The "tactile sensation" is the sensation that the human body may recognize through the skin and includes sensations due to effects of force such as a vibration and a pressure and thermal sensations such as warmth and coldness. Presenting a tactile sensation via the air is causing the human body to sense a tactile sensation without contact with the human body. In this embodiment, the acoustic radiation pressure of an ultrasonic wave is used as presentation of a tactile sensation via the air.

The tactile sensation presenting device 3 of this embodiment includes an ultrasonic vibrator array that is configured by arraying plural ultrasonic vibrators. The ultrasonic vibrator array may present the sense of touch on a surface of the human body by creating a focus of an ultrasonic wave in an arbitrary position in the air. A static pressure that is referred to as acoustic radiation pressure occurs at the focus of the ultrasonic wave in addition to a vibration of an acoustic pressure. The acoustic radiation pressure occurs in a case where the ultrasonic wave that propagates in the air is blocked by an object that has different acoustic impedance from the air. As for ultrasonic wave with a high acoustic pressure level, the ultrasonic wave is blocked by the surface of the body, and this causes a force that pushes the surface of the body and is recognizable by a person. That is, a force may be presented to the body in a contactless manner. In general, a person is capable of sensing the frequencies of 20 Hz or higher to 20 kHz or lower as sound, and this frequency band is referred to as audible range. An "ultrasonic wave" is an acoustic wave that has a frequency of 20 kHz or higher and is not audible to the ear of a person. In order to present the tactile sensation independently from the sense of hearing, the frequency may be set to 20 kHz or higher. There is not a restriction of the upper limit of the frequency of the ultrasonic wave. However, because the attenuation of an ultrasonic wave that propagates in the air increases as the frequency becomes higher, the frequency of the ultrasonic wave that is used for presenting the tactile sensation is desirably set to 20 to 200 kHz and more desirably 20 to 100 kHz. The acoustic pressure level of the ultrasonic wave that may present a pressure which is recognizable by a person to the surface of the body is set to 140 dB or higher, desirably 150 dB or higher, more desirably 160 dB or higher.

The acoustic radiation pressure may be changed through time by intermittently driving the ultrasonic vibrator and/or performing amplitude modulation of an ultrasonic vibration. Accordingly, a vibration may be presented to the user. Cutaneous receptors that function for the sense of vibration exhibit high sensitivities at specific frequencies of vibration. Thus, the modulation frequency of the acoustic radiation pressure may be adjusted to those frequencies of vibration. Accordingly, it is possible that the same acoustic radiation pressure provides a stronger tactile sensation. The modulation frequency is desirably set to 0 to 300 Hz and more desirably 100 to 300 Hz.

[2. Setting of Home Position]

Figure 2:
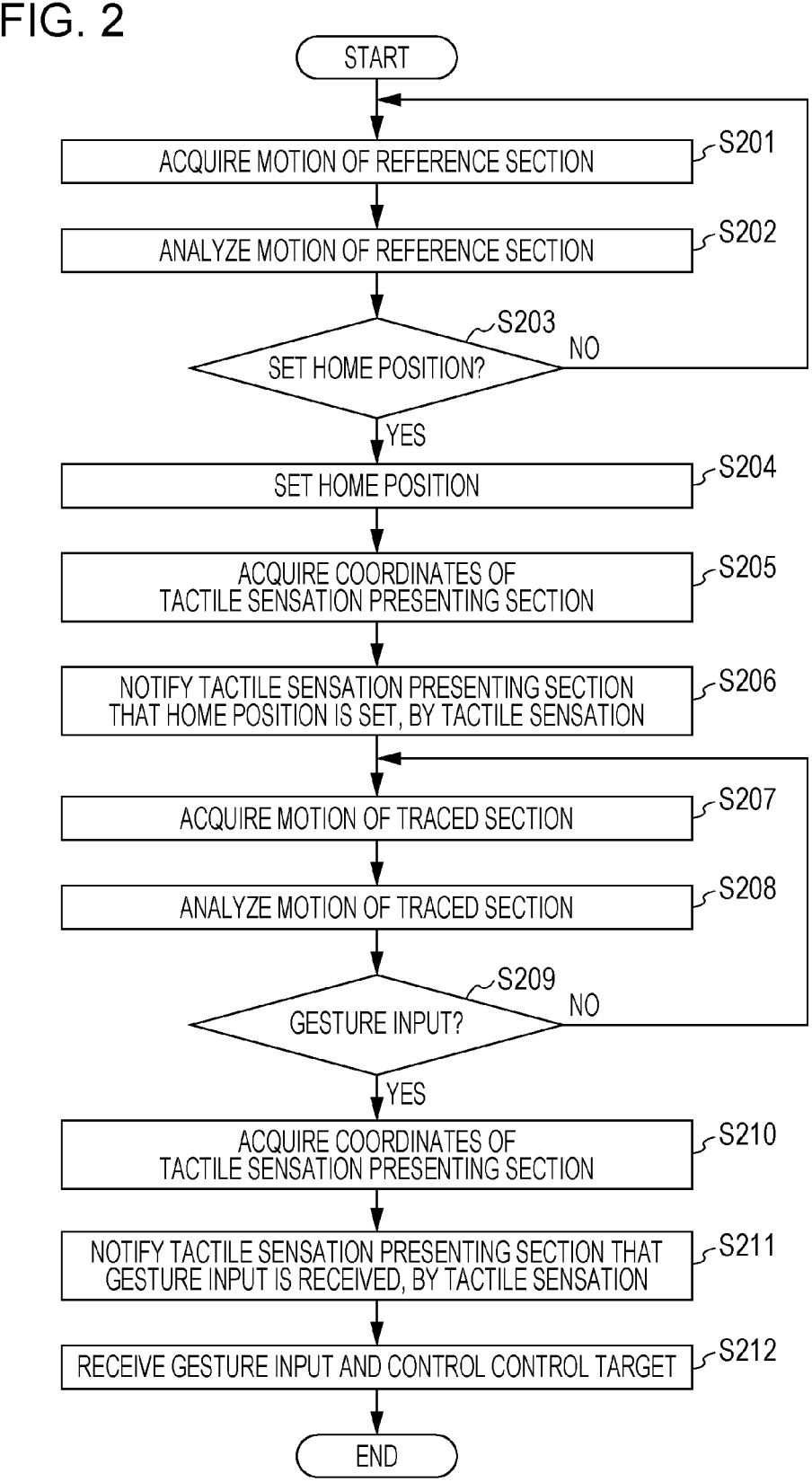
FIG. 2 is a flowchart of a gesture input method of the first embodiment.
Figure 3:
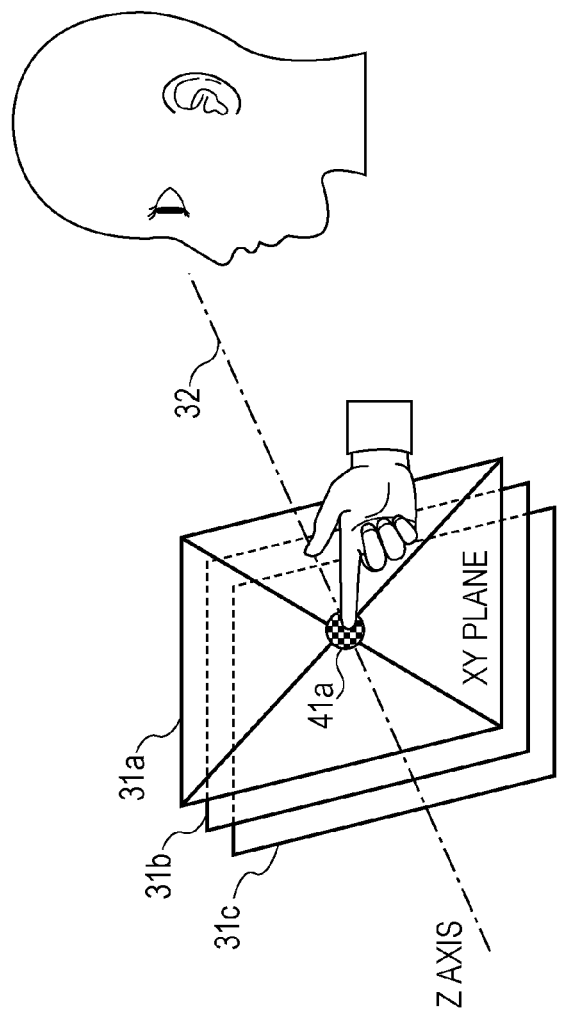
FIG. 3 is a schematic diagram that illustrates one example of a plane assumed in a real space in a case where a home position is set in the first embodiment.

FIG. 2 illustrates a gesture input method according to this embodiment. FIG. 3 illustrates one example of a plane in the real space in a case where the home position is set in this embodiment. In FIG. 2, the gesture input system 100 first sets the home position (S201 to S206).

After the gesture input system 100 is started, the sensor 1 starts acquiring the motion of the reference section, which is a portion of the body of the user, in accordance with an instruction of the control unit 21 (S201). There may be one or plural reference sections. Specifically, as one example, the sensor 1 acquires the real coordinates of the reference section as the information about the motion of the reference section. The real coordinates of the reference section will be referred to as "reference coordinates". The sensor 1 outputs the acquired information about the motion of the reference section to the input control device 2.

In the input control device 2, the control unit 21 analyzes the motion of the reference section based on the information from the sensor 1 (S202). For example, the control unit 21 analyzes the movement amount of the reference section, the movement velocity of the reference section, the movement direction of the reference section, and the stationary time of the reference section based on the reference coordinates and thereby analyzes the motion of the reference section. The control unit 21 determines whether or not a prescribed motion is detected based on the results of the analysis (S203). The prescribed motion is a motion by which the user demonstrates an intention of setting the home position and is in advance decided by an arbitrary combination of the movement amount, the movement velocity, the movement direction, the stationary time, and so forth of the reference section. Information of the prescribed motion is stored in the storage unit 22. For example, a motion in which the index finger of the right hand (that is, the reference section) passes or crosses a plane 31a assumed in the real space, as illustrated in FIG. 3, may be decided in advance as the prescribed motion. Accordingly, the user is enabled to set the home position only by the index finger of the right hand.

In a case where the control unit 21 does not detect the prescribed motion (that is, a case where a determination is made that the user does not express the intention of setting the home position) (No in S203), the process returns to step S201, and the acquisition of the motion of the reference section by the sensor 1 is continued.

In a case where the control unit 21 detects the prescribed motion (that is, a case where a determination is made that the user expresses the intention of setting the home position) (Yes in S203), the home position that is the base point in the real space is set (S204). Specifically, the real coordinates of the traced section at the time point at which the prescribed motion is detected is acquired from the sensor 1, and those real coordinates are set as the home position. The traced section may be decided in advance before the home position is set or may be decided simultaneously with the setting of the home position. The control unit 21 stores information of the coordinates of the set home position in the storage unit 22. The home position is referred to as the base point in the gesture input.

The control unit 21 acquires the real coordinates of the tactile sensation presenting section from the sensor 1 (S205). The tactile sensation presenting section may be decided in advance before the home position is set or may be decided simultaneously with the setting of the home position. There may be one or plural tactile sensation presenting sections. The real coordinates of the tactile sensation presenting section will be referred to as "tactile sensation presenting coordinates". The control unit 21 stores the acquired tactile sensation presenting coordinates in the storage unit 22.

After the home position is set, the tactile sensation presenting device 3 presents the tactile sensation to the tactile sensation presenting section of the user, which is indicated by the tactile sensation presenting coordinates in accordance with an instruction of the control unit 21, in a contactless manner and thereby notifies the user that the home position is set (S206). Accordingly, the user may recognize that the home position is set independently from the sense of sight, the sense of hearing, or the sense of touch through a solid body and may recognize the position of the traced section at the time when the tactile sensation is presented as the position of the home position.

The tactile sensation presenting section and the traced section may be the same. In this case, the user may recognize that the home position is set in the position of the home position by the tactile sensation. Thus, a more intuitive gesture input is enabled.

[3. Combination of Reference Section, Tactile Sensation Presenting Section, and Traced Section]

The reference section, the tactile sensation presenting section, and the traced section may be set to arbitrary portions of the body. For example, all of the reference section, the tactile sensation presenting section, and the traced section may be set to the fingertip of the index finger of the right hand in advance. For example, as illustrated in FIG. 3, the gesture input system 100 may determine that the user expresses the intention of setting the home position in a case where the fingertip of the index finger of the right hand of the user crosses the plane 31a assumed in the real space. In this case, the gesture input system 100 may set the real coordinates of the fingertip of the index finger of the right hand at the time when the crossing of the fingertip of the index finger of the right hand of the user across the plane 31a is detected as the home position and may present the tactile sensation to the fingertip of the index finger of the right hand in a contactless manner about the fact that the home position is set.

As another example, the eyelids of both eyes may be set as the reference sections, the fingertip of the index finger of the right hand may be set as the traced section, and the forehead may be set as the tactile sensation presenting section in advance. For example, the gesture input system 100 may determine that the user expresses the intention of setting the home position in a case where the user blinks both of the eyes two times successively. In this case, the gesture input system 100 may set the real coordinates of the fingertip of the index finger of the right hand at the time when the two successive blinks of both of the eyes are detected as the home position and may present the tactile sensation to the forehead in a contactless manner about the fact that the home position is set.

As still another example, the fingertips of the five fingers of the right hand may be set as the reference sections in advance. For example, the gesture input system 100 may determine that the user expresses the intention of setting the home position in a case where the fingertip of any one of the five fingers of the right hand of the user crosses the plane 31a assumed in the real space. In this case, the gesture input system 100 may set the real coordinates of the fingertip of any one of the five fingers of the right hand at the time when the crossing of the fingertip of the one finger across the plane 31a is detected as the home position and may present the tactile sensation to the fingertip of the one finger in a contactless manner about the fact that the home position is set.

[4. Association Between Virtual Space and Real Space]

Figure 4:
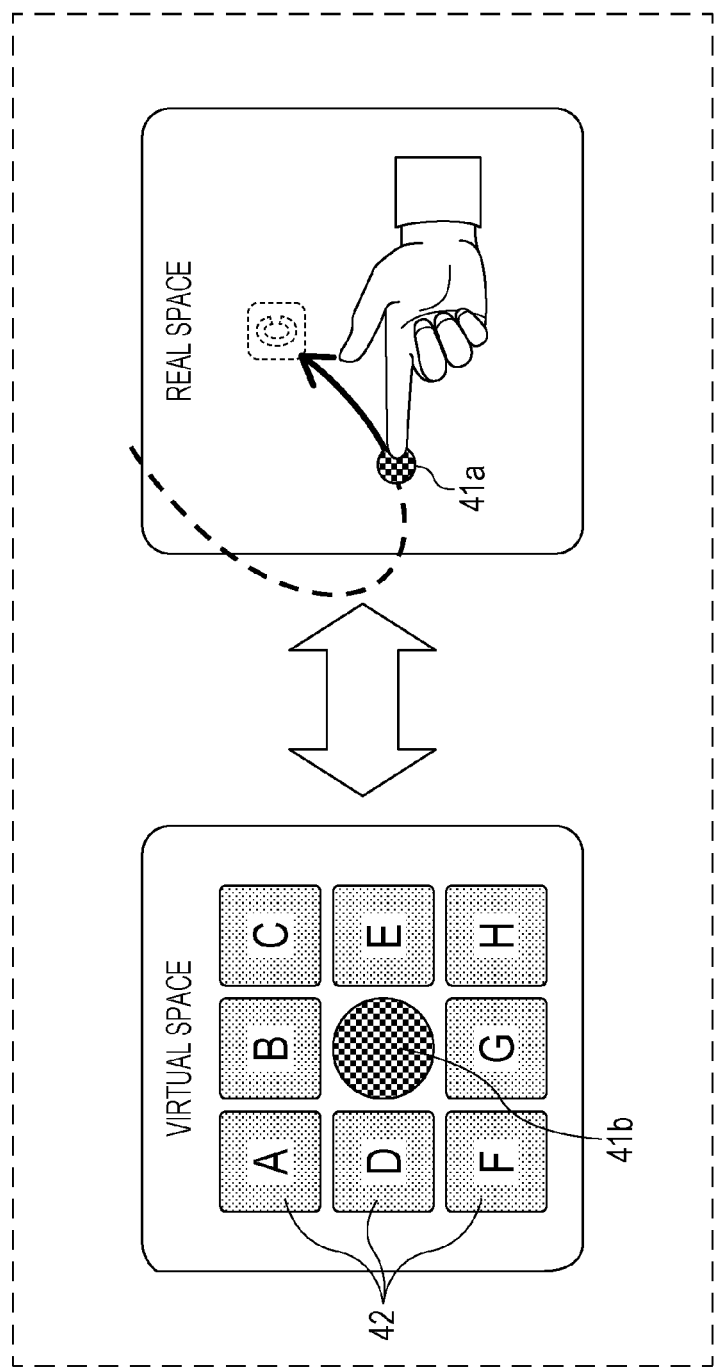
FIG. 4 is a schematic diagram that illustrates one example of association between a virtual space and the real space in the first embodiment.

FIG. 4 illustrates an example of association between the virtual space and the real space. The input control device 2 in advance arranges a home position 41b to serve as the base point in the virtual space and icons 42 in the virtual space and stores the coordinates of the home position 41b and the icons 42 in the virtual space in the storage unit 22. The icon 42 is a selectable part, which is a region for receiving a prescribed input. The input control device 2 allocates a different function for the control target 4 to each of the icons 42. The home position 41b and the icons 42 that are defined in the virtual space may not actually be seen by the eyes. Thus, the user may not observe or touch the home position 41b or the icons 42 in the virtual space in the gesture input. Thus, the arrangement relationship between the home position 41b and the icons 42, which are defined in the virtual space, are in advance made recognizable by the user. For example, a display device (not illustrated) or the like is caused to visually display the home position 41b and the icons 42 for a prescribed time when the gesture input system 100 is started or the user makes an instruction. Accordingly, the user may in advance recognize the arrangement relationship between the home position 41b and the icons 42, which are defined in the virtual space.

Here, coordinates in the real space may be referred to as "global coordinates", and coordinates in the virtual space may be referred to as "local coordinates". The input control device 2 associates the global coordinates of a home position 41a in the real space with the local coordinates of the home position 41b in the virtual space when the home position 41a in the real space is set. Accordingly, the user may recognize the position of the home position 41a in the real space as the position of the home position 41b in the virtual space when the user recognizes that the home position 41a is set by the tactile sensation. Thus, the user is enabled to select the icon 42 in the virtual space by the motion of the body in the real space. For example, in the virtual space illustrated in FIG. 4, it is assumed that the icon 42 of "C" is in advance defined in the position at 45° in an upper right direction and at a distance of 30 mm with respect to the home position 41b as the base point. In this case, the user moves the fingertip of the index finger of the right hand as the traced section to the position at 45° in the upper right direction and at a distance of 30 mm with respect to the home position 41a in the real space as the base point and may thereby select the "C" icon 42 in the virtual space. In addition, for example, the user may keep the index finger of the right hand as the traced section still in the position that corresponds to the "C" icon 42 for a prescribed time or longer and is thereby enabled to execute the function that is allocated to the "C" icon 42. For example, a parameter about the control target 4, which is related to the icon 42, may be changed.

The position in the real space that is associated with the position of the icon 42 in the virtual space may arbitrarily be set by using the home positions 41a and 41b as a common point. For example, as illustrated in FIG. 3, the position in the real space that corresponds to the position of the icon 42 in the virtual space may be set on planes 31a, 31b, and 31c that are vertical to an axis 32 which connects the position of the home position 41a in the real space with the face of the user.

[5. Gesture Input]

In FIG. 2, after setting the home position 41a, the gesture input system 100 receives the gesture input with the home position being the base point (S207 to S212).

After the home position is set, the sensor 1 starts acquiring the motion of the traced section in accordance with an instruction of the control unit 21 (S207). There may be one or plural traced sections. Specifically, as one example, the sensor 1 acquires the real coordinates of the traced section as information about the motion of the traced section. The real coordinates of the traced section will be referred to as "traced coordinates". The sensor 1 outputs the acquired information about the motion of the traced section to the input control device 2.

In the input control device 2, the control unit 21 analyzes the motion of the traced section based on the information from the sensor 1 (S208). For example, the control unit 21 analyzes the relative relationship between the home position 41a and the traced coordinates and thereby analyzes the state change of the traced section with respect to the home position 41a as the base point, for example, the combination of the movement amount, the movement velocity, the movement direction, and the stationary time. The control unit 21 determines whether or not a prescribed gesture input for executing a prescribed function is detected based on the results of the analysis (S209). An operation for executing the prescribed function is in advance associated with the prescribed gesture input, and information of the association relationship is stored in the storage unit 22. For example, in FIG. 4, when the user moves the fingertip of the index finger of the right hand to the position at 45° in the upper right direction and at a distance of 30 mm with respect to the home position 41a in the real space as the base point, the control unit 21 determines that the "C" icon 42 in the virtual space is selected. In addition, when the user keeps the index finger of the right hand still in the position that corresponds to the "C" icon 42 for the prescribed time or longer, the control unit 21 determines that an instruction for execution of the function allocated to the "C" icon 42 is made, that is, the gesture input is performed. On the other hand, when the user does not keep the index finger of the right hand still in the position that corresponds to the "C" icon 42 for the prescribed time or longer but moves the index finger of the right hand from the position that corresponds to the "C" icon 42, the control unit 21 determines that the instruction for execution of the function allocated to the "C" icon 42 is not made, that is, the gesture input is not performed.

In a case where the control unit 21 does not detect the prescribed gesture input (No in S209), the process returns to step S207, and the acquisition of the motion of the traced section by the sensor 1 is continued.

In a case where the prescribed gesture input is detected (Yes in S209), the control unit 21 acquires the tactile sensation presenting coordinates from the sensor 1 (S210). The tactile sensation presenting device 3 notifies the tactile sensation presenting section that is indicated by the tactile sensation presenting coordinates that the gesture input is received in accordance with an instruction of the control unit 21 in a contactless manner (S211). Specifically, for example, in FIG. 4, the tactile sensation presenting device 3 presents the tactile sensation to the tactile sensation presenting section in a case where the traced section comes to the position that corresponds to the icon 42 and again presents the tactile sensation to the tactile sensation presenting section in a case where the gesture input is received and the function allocated to the icon 42 is executed. The intensity of pressure or the vibration may be changed between a case where the traced section comes to the position that corresponds to the icon 42 and a case where the gesture input is received and the function allocated to the icon 42 is executed. Further, the tactile sensation in a case where the traced section comes to the position that corresponds to the icon 42 and the tactile sensation in a case where the gesture input is received and the function allocated to the icon 42 is executed may be the same as or different from the tactile sensation in a case where the home position is set. In addition, the section to which the tactile sensation is presented is not limited to the tactile sensation presenting section in a case where the setting of home position is notified but may be another section.

The input control device 2 receives the gesture input and controls the control target 4 (S212). For example, in a case where the control target 4 is an audio device and a function of increasing the sound volume of the audio device is allocated to the selected icon 42, the input control device 2 increases the sound volume of the audio device.

[6. Effects and Supplemental Matters]

In the gesture input system 100 of this embodiment, because an input is performed by a gesture, an input in an arbitrary position is possible in a detection range of the sensor 1. Thus, the hand does not have to be moved to the position of the input unit such as a touch panel for performing an input. In addition, because the gesture input system 100 of this embodiment notifies the user that the home position is set in a contactless manner, the user may recognize the position of the home position without directing the eyes in the direction to the display unit. Accordingly, the user may perform an input accurately and quickly. Thus, the gesture input system 100 of this embodiment improves convenience for the user. The user may set the home position and recognize the position thereof independently from the sense of sight or the sense of hearing. Thus, the user may intuitively carry out the gesture input with the home position being the base point.

Because the gesture input system 100 of this embodiment presents the home position by the tactile sensation in a contactless manner, the user may recognize the home position independently from the sense of sight, the sense of hearing, or the sense of touch through a solid body. Accordingly, for example, the user may perform a desired input operation quickly and accurately by depending on the sense of touch even in a situation in which the user may not watch the display unit. Further, for example, the user may perform a desired input operation quickly and accurately by depending on the tactile sensation even in a situation in which the user may not listen to a sound presentation. The gesture input system 100 of this embodiment may execute a desired function without being restricted to objects such as buttons that are mechanically configured.

In this embodiment, a description is made about an example where the sensor 1 detects the motion of the portion of the body of the user and thereby acquires each of the reference coordinates, the traced coordinates, and the tactile sensation presenting coordinates. However, the control unit 21 may analyze the information from the sensor 1 and thereby acquire the reference coordinates, the traced coordinates, and the tactile sensation presenting coordinates. For example, the sensor 1 may output the distance image of a region that includes all of the reference section, the traced section, and the tactile sensation presenting section, and the input control device 2 (the control unit 21) may analyze the distance image and thereby acquire the reference coordinates, the traced coordinates, and the tactile sensation presenting coordinates.

The gesture input system 100 of this embodiment may be configured such that the user may in advance and freely set the motion of the reference section to serve as a determination reference for the setting of the home position (S203) and the motion of the traced section to serve as a determination reference for the gesture input (S209) in accordance with his/her preference. Further, the configuration may be made such that the user may in advance set the reference section, the traced section, and the tactile sensation presenting section.

In this embodiment, the acoustic radiation pressure of an ultrasonic wave is used as the presentation of the tactile sensation via the air. However, embodiments are not limited to this, but a flow of air or infrared rays may be used as the presentation of the tactile sensation via the air. For example, it is possible to present a heat sensation to the body in a contactless manner by using infrared rays. Further, the notification to the user may be notifications other than the tactile sensation as long as the notification to the user is made in a contactless manner. For example, the setting of home position and reception of the gesture input may be notified to the user by sound or light.

Second Embodiment

Figure 5:
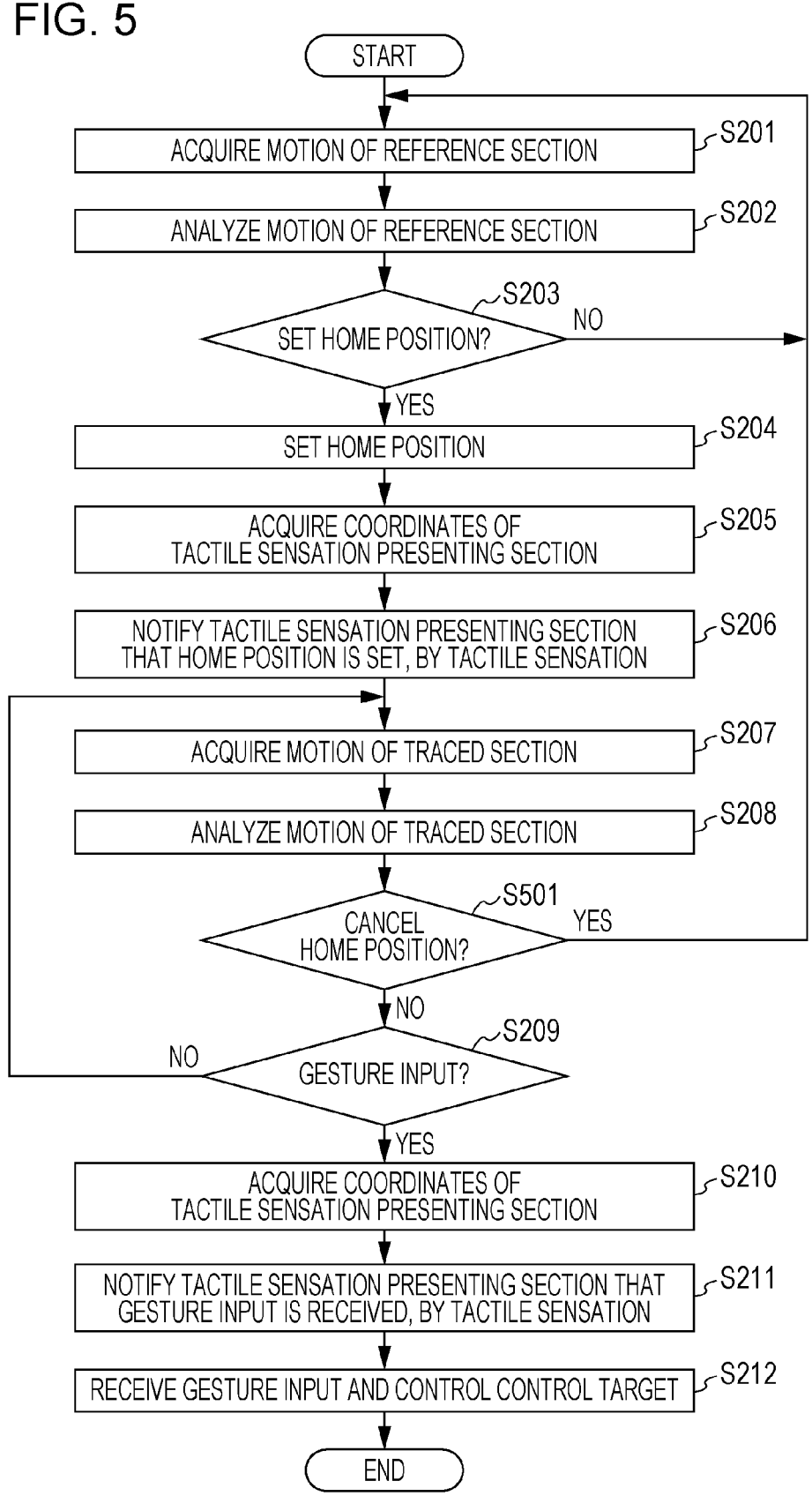
FIG. 5 is a flowchart that illustrates one example of a gesture input method in a second embodiment.

In a second embodiment, the gesture input system 100 is enabled to recall the setting of the home position. FIG. 5 illustrates one example of a flowchart that illustrates a gesture input process of the second embodiment. The flowchart illustrated in FIG. 5 is the flowchart illustrated in FIG. 2 to which step S501 of canceling the home position is added. In FIG. 5, each of the steps other than step S501 of canceling the home position is the same as FIG. 2.

A gesture for canceling the home position is in advance decided, and information of the gesture is stored in the storage unit 22. When the control unit 21 of the input control device 2 analyzes the motion of the traced section (S208) after setting the home position, the control unit 21 determines whether the gesture for canceling the home position is detected (S501). For example, the control unit 21 determines whether the gesture for canceling the home position is performed based on the relative relationship between the traced section and the home position. In a case where the gesture for canceling the home position is detected (Yes in S501), the setting of the home position is recalled, and the process returns to the acquisition of the motion of the reference section (S201). This enables reconfiguration of the home position based on the motion of the reference section (S204). In a case where the gesture for canceling the home position is not detected (No in S501), the control unit 21 determines whether a gesture input for executing the function allocated to the icon 42 is detected (S209).

Figure 6:
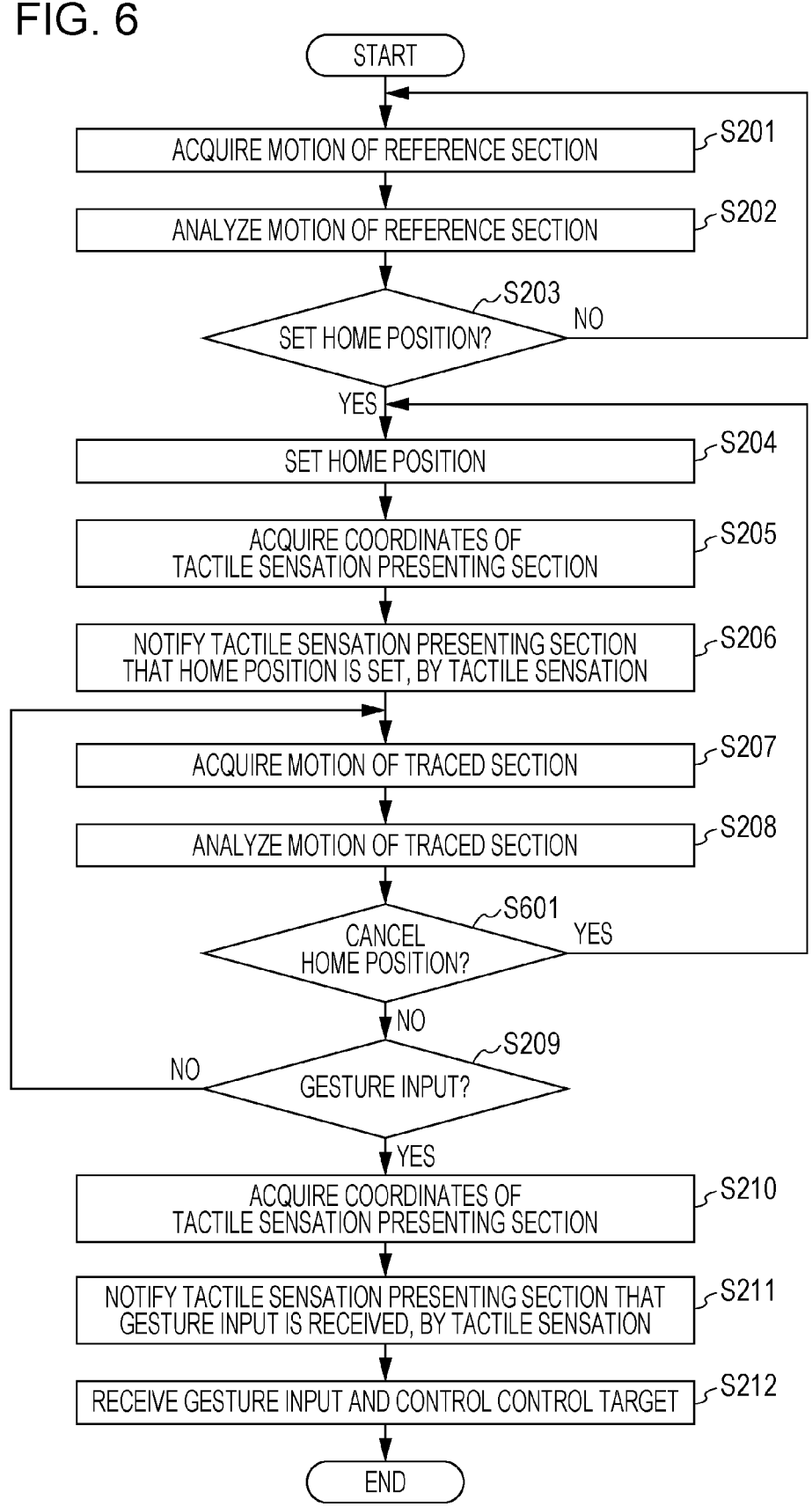
FIG. 6 is a flowchart that illustrates another example of the gesture input method in the second embodiment.

The reconfiguration of the home position may not be performed based on the motion of the reference section but may be performed based on the position of the traced section that is analyzed in the cancellation of the home position. FIG. 6 illustrates another example of the gesture input process of the second embodiment. The flowchart illustrated in FIG. 6 includes step S601 of canceling the home position, similarly to the flowchart illustrated in FIG. 5. However, in FIG. 6, in a case where the control unit 21 detects the gesture for canceling the home position (Yes in S601) during the analysis of the motion of the traced section (S208), the control unit 21 reconfigures the home position based on the position in the real space of the traced section that is analyzed (S204).

In this embodiment, the home position may be reconfigured in a case where the home position is set against the intention of the user, for example. Note that the gesture for canceling the home position is not limited to the motion of the traced section but may be a motion of a portion of the body other than the traced section.

Third Embodiment

A description will be made about an example where the gesture input system 100 illustrated in FIG. 1 is installed in an automobile and the control target 4 is a device that is built in the automobile.

As the sensor 1 that detects a motion of the human body, a sensor is used which employs a scheme referred to as "time of flight (TOF)", which obtains depth information from the time in which projected infrared rays return by reflection, and the motion of the user is thereby detected three-dimensionally. For example, a "Kinect v2" sensor from Microsoft Corporation may be used. This sensor 1 is placed under a windshield in front of a driver seat in order to detect the motion of the hand of a driver.

The tactile sensation presenting device 3 includes the ultrasonic vibrator array that uses the acoustic radiation pressure of an ultrasonic wave. For example, in the ultrasonic vibrator array, 249 ultrasonic vibrators with a drive frequency of 40 kHz are arrayed in a lattice manner. The tactile sensation presenting device 3 individually drives each of the ultrasonic vibrators and thereby creates a focus of an ultrasonic wave in an arbitrary position in the air. Accordingly, an acoustic pressure with a magnitude that may not be output by a single ultrasonic vibrator may be formed in a focus spot. For example, 249 ultrasonic vibrators, each of which exhibits an output of less than 120 dB in a measurement distance of 300 mm in a case of being driven as a single ultrasonic vibrator, are prepared. Those ultrasonic vibrators are arrayed in a lattice manner such that the outputs form the focus in a location of 300 mm. In this case, an acoustic pressure level of 159 dB may be obtained in the focus spot. At the focus of an ultrasonic wave, a static pressure that is referred to as acoustic radiation pressure occurs, the static pressure is blocked by the surface of the body, and a force that pushes the body surface occurs. Accordingly, a pressure may be presented to the body in a contactless manner. In addition, the ultrasonic vibrators are intermittently driven to change the acoustic radiation pressure through time, and a vibration may thereby be presented to the user. For example, the ultrasonic vibrators are driven while an amplitude modulation of a square wave of 200 Hz is applied thereto, and a vibration may thereby be presented to the user. The ultrasonic vibrator array is placed on an upper surface of a steering column in order to present the tactile sensation to the fingertip of the driver who operates the steering.

The gesture input system 100 is started when an engine of the automobile is driven. Accordingly, the sensor 1 starts acquiring the motion of the driver. In this embodiment, the fingertip of the index finger of the right hand of the driver is detected as the reference section. Further, the tactile sensation presenting section to which the tactile sensation is presented and the traced section in performing the gesture input are in advance set to the fingertip of the index finger of the right hand of the driver.

Figure 7:
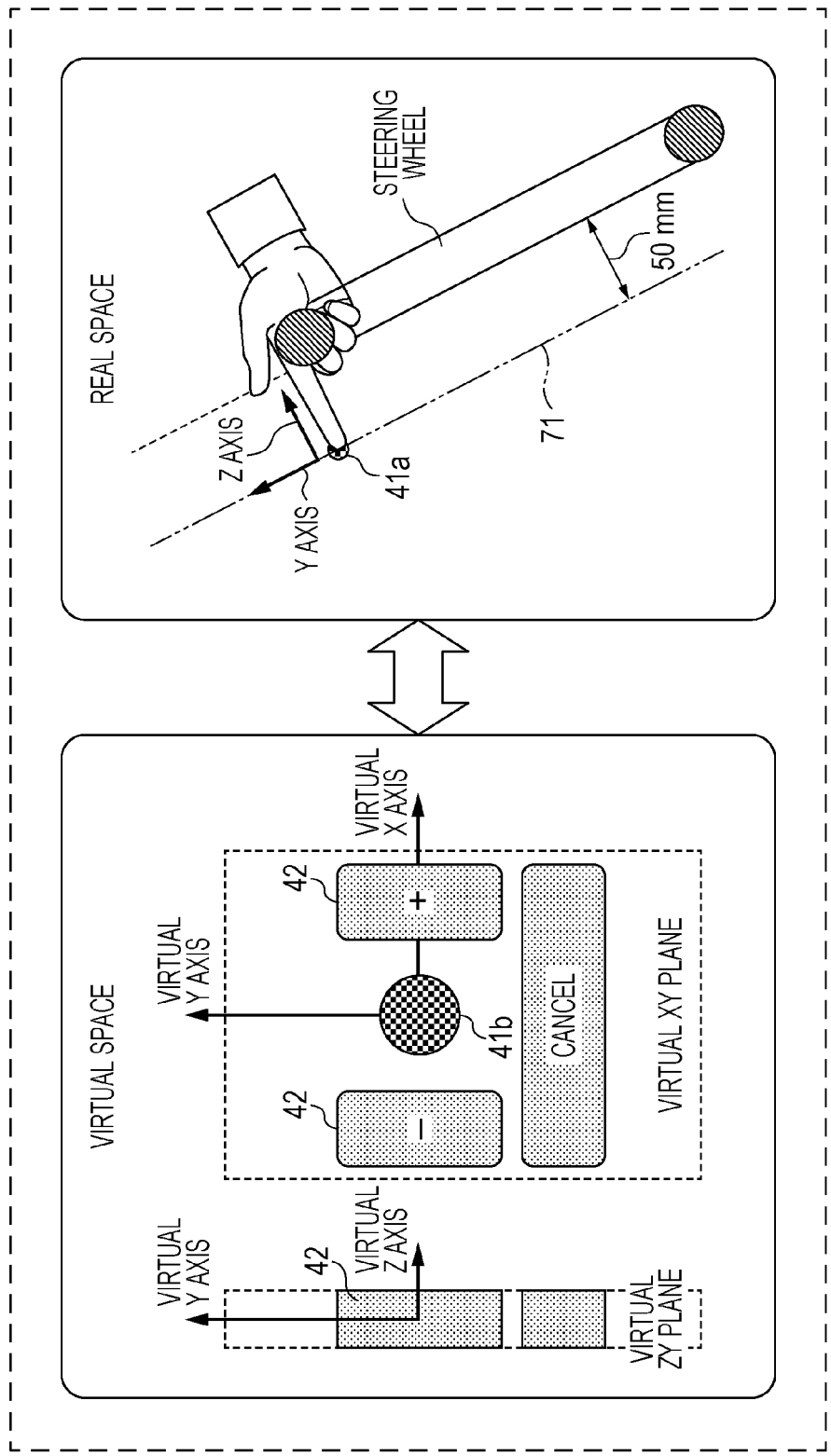
FIG. 7 is a schematic diagram that illustrates one example of association between the virtual space and the real space in a third embodiment.

FIG. 7 illustrates an example of the association between the virtual space and the real space in a case where the gesture input system 100 is installed in the automobile. In this embodiment, as the motion that is performed by the user to demonstrate an intention of requesting the setting of the home position, a motion in which the fingertip of the index finger of the right hand as the reference section crosses a plane 71 that is separated by 50 mm from a steering wheel of the automobile is set in advance. Accordingly, the driver may express the intention of requesting the setting of the home position by raising one finger of the right hand while gripping the steering wheel even during driving.

In a case where the control unit 21 detects via the sensor 1 that the fingertip of the index finger of the right hand crosses the plane 71 that is separated by 50 mm from the steering wheel of the automobile, the control unit 21 sets the position of the finger tip of the index finger of the right hand as the home position 41a and sets the position as the tactile sensation presenting coordinate. Those settings are stored in the storage unit 22.

The control unit 21 brings the focus of the ultrasonic wave from the tactile sensation presenting device 3 to the fingertip that is set as the home position 41a in order to notify the driver that the home position 41a is set. In this case, the tactile sensation presenting device 3 applies the amplitude modulation of 200 Hz to the ultrasonic wave. Accordingly, the driver may sense the vibration. Thus, the driver may recognize that the home position 41a is set and the position of the home position 41a by the tactile sensation independently from the sense of sight, the sense of hearing, or the sense of touch through a solid body.

The sensor 1 acquires the motion of the fingertip of the right hand of the driver that is referred to in the setting of the home position 41a. The input control device 2 analyzes the relative relationship between the motion of the fingertip of the right hand of the driver and the home position 41a and makes a determination about the gesture.

For example, as illustrated in FIG. 7, the input control device 2 in advance decides the position of the icon 42 for adjusting the sound volume of the audio device as virtual coordinates and stores the coordinates in the storage unit 22. The input control device 2 associates the home position 41b in the virtual space with the home position 41a in the real space and associates X axis, Y axis, and Z axis in the virtual space with X axis, Y axis, and Z axis in the real space, respectively. The input control device 2 analyzes whether the fingertip of the right hand of the driver is in the position that corresponds to the icon 42 from the relative relationship between the home position 41a in the real space and the fingertip of the right hand. In a case where the fingertip of the right hand of the driver is in the position that corresponds to the icon 42, a determination is made that the icon 42 is selected.

The user assumes that the icon 42 in the virtual space is in the position that corresponds to the position in the real space based on the home position 41a in the real space. In a case where the control target 4 is the audio device that is installed in the automobile and the user requests to increase the sound volume of the audio device, the user moves the fingertip of the right hand from the position of the home position 41a in the positive direction of the X axis in the real space. The input control device 2 may determine that the fingertip of the right hand of the user is moved from the home position 41b in the virtual space in the direction of a "+" icon 42 based on movement of the fingertip of the right hand in the real space by the user. In a case where the fingertip of the right hand of the user is present in a region that corresponds to the "+" icon 42 for a prescribed time or longer, the input control device 2 determines that an instruction for execution of a function allocated to the "+" icon 42 is made and increases the sound volume of the audio device by one graduation. The time in which the fingertip stays in the region of the "+" icon 42 may be related with the increase amount of the sound volume, and the sound volume may thereby be increased as the time in which the fingertip stays in the region of the "+" icon 42 becomes longer. Further, while the fingertip stays in the region of the icon 42, the tactile sensation may be presented to the fingertip in a contactless manner.

This series of steps enables the user to perform a change in the sound volume of the audio device quickly and accurately independently from the sense of sight, the sense of hearing, or the sense of touch through a solid body. The gesture input system 100 of this embodiment enables the user to inform the gesture input system 100 of the intention of setting of the home position anywhere in the plane 71 that is separated by 50 mm from the steering wheel, for example. Thus, the driver may set the home position by raising one finger of the right hand while gripping the steering wheel even during driving. Further, because the gesture input system 100 presents the setting of the home position and the reception of the gesture input by the tactile sensation, the user does not have to move the eyes toward the display unit even while driving the automobile. Thus, the user may execute an input operation without lowering the concentration on driving. Further, because a notification by using the sense of hearing is not made, a conversation with a passenger, music in the automobile, and so forth are not interfered with.

Overview of Embodiments (1) A gesture input system of the present disclosure includes: a sensor that detects a motion of a reference section as a portion of a body of a user and a motion of a traced section as a portion of the body of the user; an input control device that sets a base point in a space based on the motion of the reference section which is detected by the sensor and receives a prescribed input in response to the motion of the traced section from the base point; and a notification device that notifies a notified section as a portion of the body of the user that the base point is set by the input control device in a contactless manner.

As described above, the base point in the space is set based on the motion of the body, the prescribed input is received, and the user is notified that the base point is set in a contactless manner. Thus, performing an input accurately and quickly is enabled. The user may perform an input without moving the hand to the position of the input unit such as a touch panel, for example. Further, the user may accurately perform an input without directing the eyes in the direction to the display unit.

(2) In the gesture input system of (1), the input control device may set real coordinates of the traced section in a case where the reference section performs a prescribed motion as the base point.

Accordingly, the user may intuitively perform a gesture input by a motion of the body from the base point.

(3) In the gesture input system of (1) or (2), at least two of the reference section, the traced section, and the notified section may be the same.

Accordingly, the user may intuitively perform the gesture input by the motion of the body from the base point.

(4) In the gesture input system of any of (1) to (3), the notification device may notify a portion of the body of the user that the input control device receives a prescribed input.

Accordingly, the user may know that control based on the gesture input is executed.

(5) In the gesture input system of any of (1) to (4), the input control device may reconfigure the base point in response to the motion of the traced section.

Accordingly, the setting of the base point may be redone even in a case of accidentally setting the base point.

(6) In the gesture input system of any of (1) to (5), the notification device may perform notification by a presentation of a tactile sensation.

Accordingly, the user is enabled to perform a desired input operation accurately by depending on the sense of touch even in a situation in which the user may not watch the display unit.

(7) In the gesture input system of (6), the notification device may include plural ultrasonic vibrators and perform the notification by an acoustic radiation pressure that is output by the ultrasonic vibrators.

Accordingly, the user is enabled to perform a desired input operation accurately by depending on the sense of touch even in a situation in which the user may not watch the display unit.

(8) A gesture input method of the present disclosure includes: a step of detecting a motion of a reference section as a portion of a body of a user; a step of setting a base point in a space based on the detected motion of the reference section; a step of notifying a notified section as a portion of the body of the user that the base point is set in a contactless manner; a step of detecting a motion of a traced section as a portion of the body of the user; and a step of receiving a prescribed input in response to the motion of the traced section from the base point.

As described above, the base point in the space is set based on the motion of the body, the prescribed input is received, and the user is notified that the base point is set in a contactless manner. Thus, performing an input accurately and quickly is enabled. The user may perform an input without moving the hand to the position of the input unit such as a touch panel, for example. Further, the user may perform a correct input without directing the eyes in the direction to the display unit.

The gesture input system and the gesture input method according to all the claims of the present disclosure may be realized by cooperation or the like with hardware resources, for example, a processor and a memory, and a program.

The gesture input system of the present disclosure is useful as an input controller of a navigation device, an air conditioning device, and an audio device that are installed in an automobile, for example.

What is claimed is:

1. A system comprising:
    a sensor configured to detect a first motion of a first portion of a body of a user, and detect a second motion of a second portion of the body;
    a controller configured to set a base point at a position of the second portion at a timing when the first motion of the first portion is detected, and receive a prescribed input in response to the second motion of the second portion with respect to the base point; and
    a cutaneous notification device configured to contactlessly notify the second portion of the body that the base point is set at the position where the second portion exists at the timing.

2. The system according to claim 1,
    wherein the cutaneous notification device includes at least one selected from a group consisting of an ultrasonic vibrator, a laser, a Peltier element, an air cannon, and an infrared source.

3. The system according to claim 1,
    wherein the cutaneous notification device includes plural ultrasonic vibrators that provide an acoustic radiation pressure to the second portion.

4. The system according to claim 1,
    wherein the first portion and the second portion are the same portion of the body.

5. The system according to claim 1,
    wherein the cutaneous notification device is further configured to contactlessly notify the second portion that the prescribed input is received.

6. The system according to claim 1,
    wherein the controller is further configured to cancel the set base point in response to a third motion of the second portion.

7. The system according to claim 1,
    wherein the controller is further configured to acquire information of respective coordinate positions of the first portion and the second portion in a real space.

8. A method comprising:
    detecting, using a sensor, a first motion of a first portion of a body of a user;
    setting, using a controller, a base point at a position of a second portion of the body at a timing when the first motion is detected;
    contactlessly notifying, using a cutaneous notification device, the second portion of the body that the base point is set at the position where the second portion exists at the timing; and
    receiving, using the sensor and the controller, a prescribed input in response to a second motion of the second portion with respect to the base point.

9. The method according to claim 8,
    wherein the first portion and the second portion are the same portion of the body.

10. The method according to claim 8, further comprising:

contactlessly notifying the second portion that the prescribed input is received.

11. The method according to claim 8, further comprising:

cancelling the base point in response to a third motion of the second portion.

12. The method according to claim 8, wherein the controller further acquires information of respective coordinate positions of the first portion and the second portion in a real space.

13. The system according to claim 1, wherein the controller is further configured to set a position of an object to receive the prescribed input in accordance with the set base point position, and the cutaneous notification device is further configured to contactlessly notify the second portion of the body at a timing when the second portion is positioned at the set position of the object.

14. The system according to claim 6, wherein the controller is further configured to, after the cancelling of the set base point, reset the base point position at a new position of the second portion at a new timing when the first motion of the first portion is detected again.

15. The method according to claim 8, further comprising:

setting, using the controller, a position of an object for receiving the prescribed input in accordance with the set base point position; and contactlessly notifying, using the cutaneous notification device, the second portion of the body at a timing when the second portion is positioned at the set position of the object.

16. The method according to claim 11, further comprising:

after the cancelling of the set base point, resetting, using the controller, the base point position at a new position of the second portion at a new timing when the first motion of the first portion is detected again.

* * * * *